(12) United States Patent
Karst et al.

(10) Patent No.: US 8,617,758 B2
(45) Date of Patent: Dec. 31, 2013

(54) HUMIDITY REGULATION FUEL CELL

(75) Inventors: Nicolas Karst, Folkling (FR); Pierre Bouillon, Luynes (FR); Nelly Martin, Tours (FR); Audrey Martinent, Grenoble (FR)

(73) Assignees: STMicroelectronics (Tours) SAS, Tours (FR); Commissariat à l'Énergie Atomique et aux Énergies Alternatives, Paris (FR)

( * ) Notice: Subject to any disclaimer, the term of this patent is extended or adjusted under 35 U.S.C. 154(b) by 913 days.

(21) Appl. No.: 12/688,671

(22) Filed: Jan. 15, 2010

(65) Prior Publication Data

US 2010/0183932 A1   Jul. 22, 2010

(30) Foreign Application Priority Data

Jan. 19, 2009  (FR) .................................. 09 50313

(51) Int. Cl.
| | |
|---|---|
| H01M 8/24 | (2006.01) |
| H01M 2/38 | (2006.01) |
| H01M 2/40 | (2006.01) |
| H01M 2/08 | (2006.01) |
| H01M 2/14 | (2006.01) |

(52) U.S. Cl.
USPC ........... 429/452; 429/428; 429/455; 429/471; 429/507

(58) Field of Classification Search
USPC .......................... 429/471, 428, 455, 507, 452
See application file for complete search history.

(56) References Cited

U.S. PATENT DOCUMENTS

| | | |
|---|---|---|
| 6,127,058 A | 10/2000 | Pratt et al. |
| 6,214,487 B1 * | 4/2001 | Kelley et al. .................. 429/430 |
| 2006/0166071 A1 | 7/2006 | Morita |

FOREIGN PATENT DOCUMENTS

| | | |
|---|---|---|
| DE | 19641143 A1 | 4/1997 |
| DE | 19703171 A1 | 8/1998 |
| WO | WO 96/24958 A | 8/1996 |

OTHER PUBLICATIONS

French Search Report dated Sep. 10, 2009 from corresponding French Application No. 09/50313 filed Jan. 19, 2009.

* cited by examiner

*Primary Examiner* — Patrick Ryan
*Assistant Examiner* — Julian Anthony
(74) *Attorney, Agent, or Firm* — Wolf, Greenfield & Sacks, P.C.

(57) ABSTRACT

A hydrogen-oxygen fuel cell including a main cell and an auxiliary cell sharing a common electrolyte and having at least one separate electrode, circuitry for measuring the humidity ratio of the electrolyte, and control and switching circuitry for operating the main and auxiliary cells in parallel on a same load or separately on two different loads.

2 Claims, 3 Drawing Sheets

HUMIDITY REGULATION FUEL CELL

CROSS REFERENCE TO RELATED APPLICATIONS

This application claims the priority benefit of French patent application number 09/50313, filed on Jan. 19, 2009, entitled "HUMIDITY REGULATION FUEL CELL," which is hereby incorporated by reference to the maximum extent allowable by law.

BACKGROUND OF THE INVENTION

1. Field of the Invention

The present invention relates to fuel cells, and especially to hydrogen-oxygen fuel cells, and more specifically relates to the control of the humidification of such cells.

2. Discussion of the Related Art

As illustrated in FIG. 1, a hydrogen-oxygen fuel cell comprises a layer or sheet of an electrolyte 1 sandwiched between two catalyst layers or sheets 3 and 4 coated with conductive layers 6 and 7 intended for the contacting. The upper surface of the cell is in contact with oxygen, for example, the ambient air, and the lower surface of the cell is in contact with hydrogen.

Under such conditions, when the cell is connected to a load 8, a positive voltage appears on the upper surface side or cathode and a negative voltage appears on the lower surface side or anode, and a current flows through the load. On the anode side, the catalyst transforms gaseous hydrogen molecules into two protons and two electrons, the protons travel from the anode catalyst layer, through the electrolyte layer, to the cathode catalyst layer where reaction $2H^+ + \frac{1}{2}O_2 + 2e^- \rightarrow H_2O$ takes place, with both electrons flowing through the load.

Currently, electrolyte 1 is Nafion and catalyst 3, 7, is a carbon platinum mixture, for example comprising a few percents of platinum. The catalyst also preferably contains a given amount of Nafion, for example, from 20 to 40%.

Conductors 6 and 7 for example are very thin gold layers, to be both conductive and permeable to hydrogen or oxygen. Conductors 6 and 7 may also be formed of gold grids.

FIG. 2 shows an embodiment of a fuel cell using microelectronics techniques. This cell is formed on a silicon wafer 10 that may be coated with a first thin insulating layer 11 and with a second thicker insulating layer 12. An opening is formed in a portion of insulating layer 12. In this opening are successively deposited a catalyst layer 3, an electrolyte 1, and a second catalyst layer 4 (the thicknesses of insulating layer 12 and of layers 3, 1, and 4 may be such that at least some of layers 3, 1, and 4 extend widely beyond the opening). A lower anode electrode 6 enables to take a contact on lower catalyst layer 3. An upper cathode electrode 7 enables to take a contact on upper catalyst layer 4. Electrodes 6 and 7 are provided with openings, and channels 13 are formed in silicon wafer 10 opposite to openings in the lower surface metallization. Further, an enclosure 15 has been shown on the lower surface side of the cell, this enclosure defining a chamber used as a hydrogen buffer tank which is connected to a hydrogen source or to a hydrogen generation source.

This is an embodiment only. Various types of fuel cells that may be formed as illustrated in FIG. 2 are known in the art. For example, the silicon wafer portion which supports the actual fuel cell is preferably thinned down. This thinned-down portion of wafer 10 is bored with channels 13 letting through hydrogen. It should be understood that, generally, all wafer surfaces are coated with an insulator formed at least of native silicon oxide.

Catalyst layers 3 and 4 are formed by any means, for example, by inkjet deposition. Nafion layer 1 is for example spun on. In such a fuel cell, the power likely to be provided is especially proportional to the surface area taken up by the cell in the silicon wafer plane. Currently, the useful surface area of a fuel cell of the type described in relation with FIG. 2 ranges between 1 and 3 $cm^2$.

Such hydrogen-oxygen fuel cells are particularly appropriate for an installation in portable devices such as portable phones or computers. Their use however poses a problem since, as seen previously, the reactions associated with the cell operation imply the generation of water and the cells operate best when the water content in the electrolyte is within a limited range. In prior art, different means have been used to ensure the cell humidification, especially if said cell dries out during its operation, for example because it is placed in a very dry atmosphere, or because the very operating conditions are not favorable to the provision of water (high voltage and low current). Prior art humidification means are generally complex and for example imply the addition of water vapor to the gases (air or oxygen and hydrogen) supplying the cell. Further, the measurement of the electrolyte humidity ratio generally requiring interrupting the normal operation of the cell.

SUMMARY OF THE INVENTION

An object of an embodiment of the present invention is to provide a system for regulating the humidity ratio of a fuel cell which avoids at least some of the disadvantages of existing systems.

Another object of an embodiment of the present invention is to provide a system for regulating the humidity ratio of a fuel cell which acts without interrupting the normal cell operation.

Another object of an embodiment of the present invention is to provide such a device which is particularly simple.

Another object of an embodiment of the present invention is to provide such a device which does not require the use of techniques other than usual fuel cell manufacturing techniques.

To achieve all or part of these objects as well as others, an embodiment of the present invention provides a hydrogen-oxygen fuel cell comprising a main cell and an auxiliary cell sharing a common electrolyte and having at least one separate electrode, means for measuring the humidity ratio of the electrolyte and control and switching means for operating the main and auxiliary cells in parallel on a same load or separately on two different loads.

According to an embodiment of the present invention, the humidity ratio measurement means comprise impedance measurement means.

According to an embodiment of the present invention, the control means comprise means for periodically disconnecting the auxiliary cell from the main cell, triggering the humidity ratio measurement and, if the humidity ratio is below a desired threshold, connecting the auxiliary cell to a load which has it operate in high humidity generation conditions.

According to an embodiment of the present invention, the auxiliary cell is arranged at the periphery of the main cell.

The foregoing objects, features, and advantages of the present invention will be discussed in detail in the following non-limiting description of specific embodiments in connection with the accompanying drawings.

DETAILED DESCRIPTION

Figure 1:
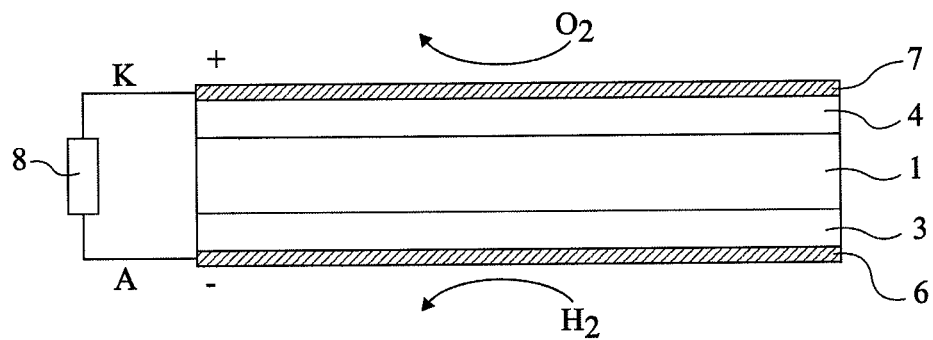
FIG. 1 is a very simplified cross-section view of a fuel cell.

For clarity, the same elements have been designated with the same reference numerals in the different drawings and, further, as usual in the representation of integrated components, the various drawings are not to scale.

Figure 3:
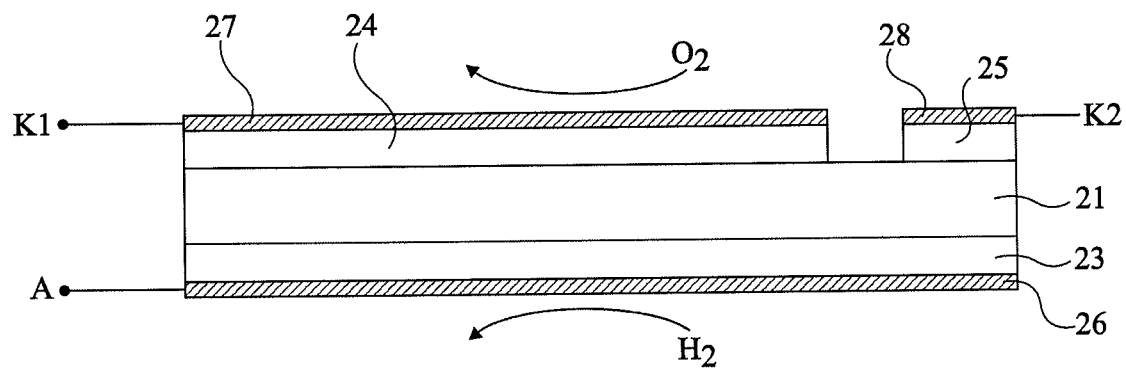
FIG. 3 is a very simplified cross-section view of a fuel cell according to an embodiment of the present invention.

FIG. 3 very schematically shows, similarly to what has been done in relation with FIG. 1, the general structure of a fuel cell according to an embodiment of the present invention. The fuel cell is divided into a main cell and an auxiliary cell which share a same electrolyte 21. On the lower surface side, a catalyst layer 23 and a conductive layer 26 are present. On the upper surface side are arranged a first main catalyst layer 24 and a second auxiliary catalyst layer 25, both layers being separate and being respectively coated with metallizations 27 and 28. Thus, the cell comprises a single anode A and two cathodes K1 and K2. As will be illustrated hereafter in relation with FIG. 6, cathode K2 is for example peripheral with respect to cathode K1. The electrolyte being permeable to water, there is a good diffusion of the water molecules and the humidity ratio is homogeneous in the entire electrolyte, on the main cell side as well as on the auxiliary cell side.

It is provided to periodically test the auxiliary cell to check whether the humidity ratio of the electrolyte is good. According to an advantage of the present invention, the test can be performed without interrupting the operation of the main cell. If the humidity ratio is not satisfactory, the auxiliary cell is operated on a load circuit distinct from the main load circuit, in conditions enabling to increase the humidity ratio of the electrolyte. This may comprise operating the auxiliary cell at high current density, for example by arranging it in short-circuit or almost in short-circuit.

Figure 4:
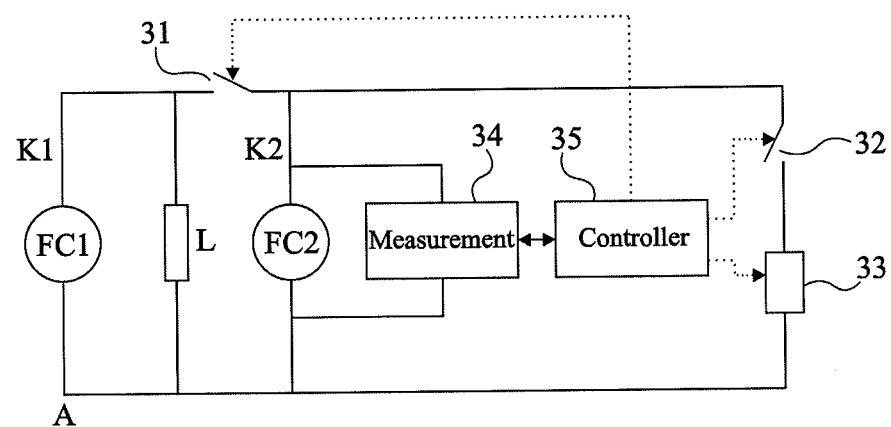
FIG. 4 shows an example of a fuel cell control circuit according to an embodiment of the present invention.

FIG. 4 shows an example of a circuit that can be used to implement the present invention. In FIG. 4, the main cell is designated as FC1 and the auxiliary cell is designated as FC2. The two cells normally power a load L, for example, the circuits of a cell phone, possibly via a buffer capacitor. A switch 31 is arranged between cathode K2 of cell FC2 and load L. Terminals A and K2 of the auxiliary cell are connected via a switch 32 to an additional load 33. The terminals of cell FC2 are also connected to a measurement circuit 34. A controller 35 controls measurement circuit 34, switches 31 and 32, and possibly load 33. The measurement circuit and the controller are for example powered by the auxiliary cell.

In normal operation, switch 31 is closed and switch 32 is open. The two cells FC1 and FC2 power load L together. Periodically, controller 35 turns off switch 31 and starts the measurement circuit which determines the characteristics of the electrolyte, for example, by an impedance measurement (or an electrochemical impedance spectrometry measurement) or by any other means known in the art. If the measurement indicates that the electrolyte is not humid enough, the controller maintains switch 31 off and switch 32 is on so that cell FC2 strongly supplies load 33. The load may be a controllable load controlled by controller 35. It may also be a simple short-circuit or a low resistance. During electrolyte rehumidification phases, the controller verifies the indications given by measurement circuit 34 and interrupts the rehumidification phases by turning switch 32 back off as soon as the humidity ratio in the electrolyte is sufficient. Then, switch 31 is turned back on and both cells operate together to power load L. The controller only periodically verifies the humidity ratio, for example, by turning off switch 31 for a short period and by performing a measurement, for example, every minute.

Figure 2:
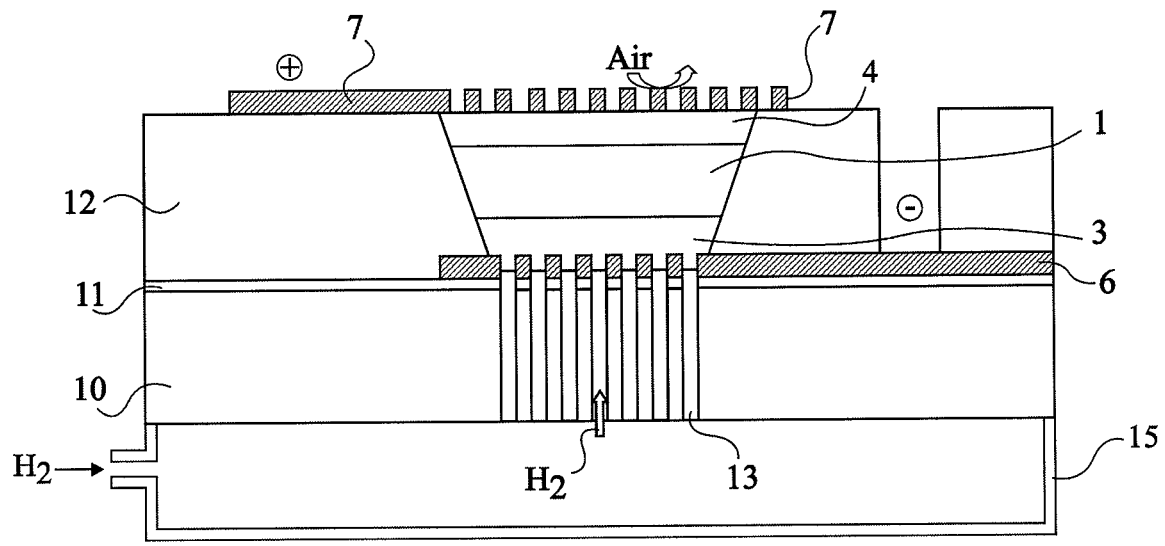
FIG. 2 is a simplified cross-section view of an embodiment of a fuel cell according to prior art.
Figure 5:
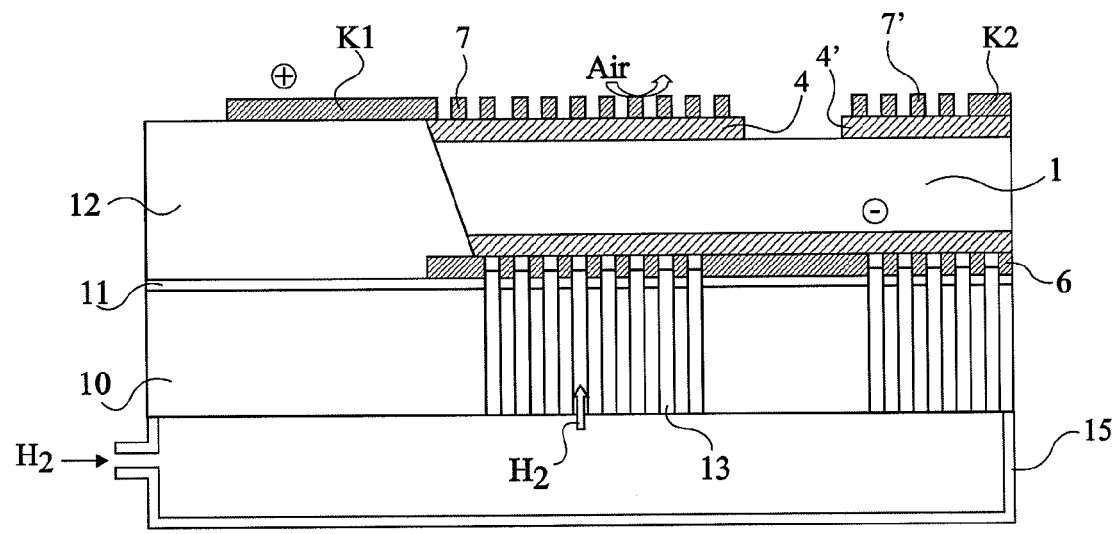
FIG. 5 is a simplified cross-section view of a fuel cell according to an embodiment of the present invention.

It should be noted that the use of an auxiliary cell component is particularly appropriate for structures of the type described in relation with FIG. 2. FIG. 5 is a cross-section view corresponding to FIG. 2 and illustrating a fuel cell according to the present invention. The same elements as in FIG. 2 are designated with the same reference numerals, and the catalyst layer and the conductive layer of the auxiliary cell are designated with reference numerals 4' and 7'.

Figure 6:
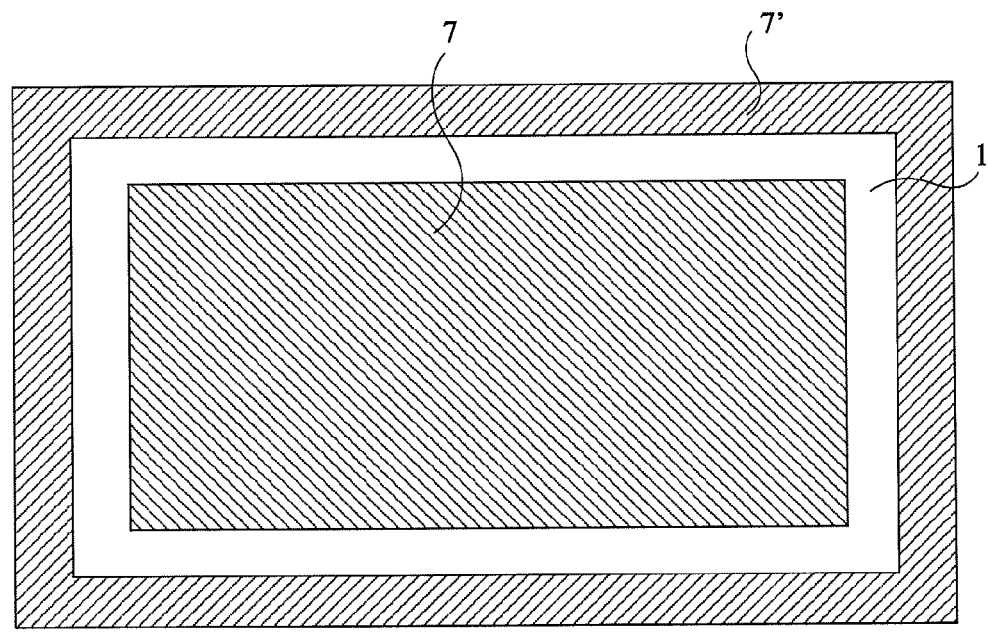
FIG. 6 is a simplified top view of an embodiment of a fuel cell according to the present invention.

FIG. 6 shows a simplified top view of a cell such as that in FIG. 5 in which the auxiliary cell is arranged at the periphery of the main cell.

Of course, the present invention is likely to have various alterations which will occur to those skilled in the art. In particular, a cell in which the main cell and the auxiliary cell have a common anode and separate cathodes has been described hereabove. The inverse situation or the case where the anode and the cathode are separate may also be provided.

The present invention has been more specifically described in relation with embodiments relating to a specific embodiment of a fuel cell in which various materials are deposited in successive layers. The present invention also applies to the case where the cell is formed from sheets of the various materials placed against one another and for example assembled under pressure.

Various embodiments with different variations have been described hereabove. It will be within the abilities of those skilled in the art to combine various elements of these various embodiments and variations without showing any inventive step. Further, materials other than Nafion may be used for the electrolyte and materials other than carbon/platinum may be used for the catalyst, for example, carbon/platinum-cobalt or carbon/platinum-nickel.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A hydrogen-oxygen fuel cell comprising:
  a main cell and an auxiliary cell sharing a common electrolyte and having at least one separate electrode,
  means for measuring the humidity ratio of the electrolyte comprising impedance measurement means, and
  control and switching means for operating the main and auxiliary cells in parallel on a same load or separately on two different loads, wherein the control and switching means comprises means for periodically disconnecting the auxiliary cell from the main cell, triggering the humidity ratio measurement and, if the humidity ratio is below a desired threshold, connecting the auxiliary cell to a load, such that the auxiliary cell operates in humidity generation conditions.

2. The fuel cell of claim 1, wherein the auxiliary cell is arranged at the periphery of the main cell.

\* \* \* \* \*